United States Patent
Downing et al.

Patent Number: 5,156,662
Date of Patent: Oct. 20, 1992

[54] EXTERIOR CENTRAL AIR FILTERING SYSTEM

[76] Inventors: Johnnie G. Downing, 433 Browning Dr.; Edward J. O'Neal, 425 Browning Dr., both of Arlington, Tex. 76010

[21] Appl. No.: 868,425

[22] Filed: Apr. 15, 1992

[51] Int. Cl.$^5$ ............................................. B01D 46/10
[52] U.S. Cl. ........................................ 55/493; 55/495; 55/501; 55/496; 55/511; 55/DIG. 31
[58] Field of Search ............... 55/385.1, 493, 495, 55/496, 501, 508, 511, DIG. 31

[56] References Cited

U.S. PATENT DOCUMENTS

| | | | |
|---|---|---|---|
| 3,408,438 | 10/1968 | Staunton | 55/DIG. 31 X |
| 4,193,780 | 3/1980 | Cotton, Jr. et al. | 55/378 |
| 4,322,232 | 3/1982 | Beane | 55/360 |
| 4,449,993 | 5/1984 | Bergeron | 55/379 |
| 4,746,339 | 5/1988 | Millard | 55/302 |
| 4,749,390 | 6/1988 | Burnett et al. | 55/DIG. 31 X |
| 4,889,543 | 12/1989 | Burt | 55/511 X |
| 5,102,436 | 4/1992 | Grabowski | 55/496 X |

*Primary Examiner*—Charles Hart
*Attorney, Agent, or Firm*—Henderson & Sturm

[57] ABSTRACT

An exterior filter system (10) for the housing (101) of a conventional A/C system (100); wherein, the filter system (10) comprises an elongated rectangular filter member (20) releasably secured and suspended by strap members (30) around the sidewalls (102) of the A/C housing (101) to prevent dirt and debris from passing through the intake vents (103) of the A/C system.

4 Claims, 2 Drawing Sheets

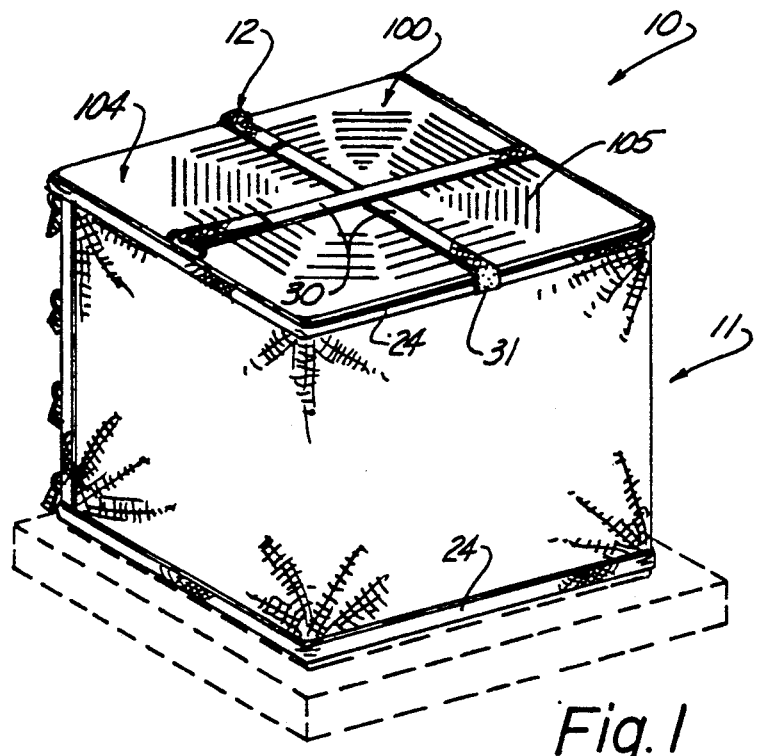
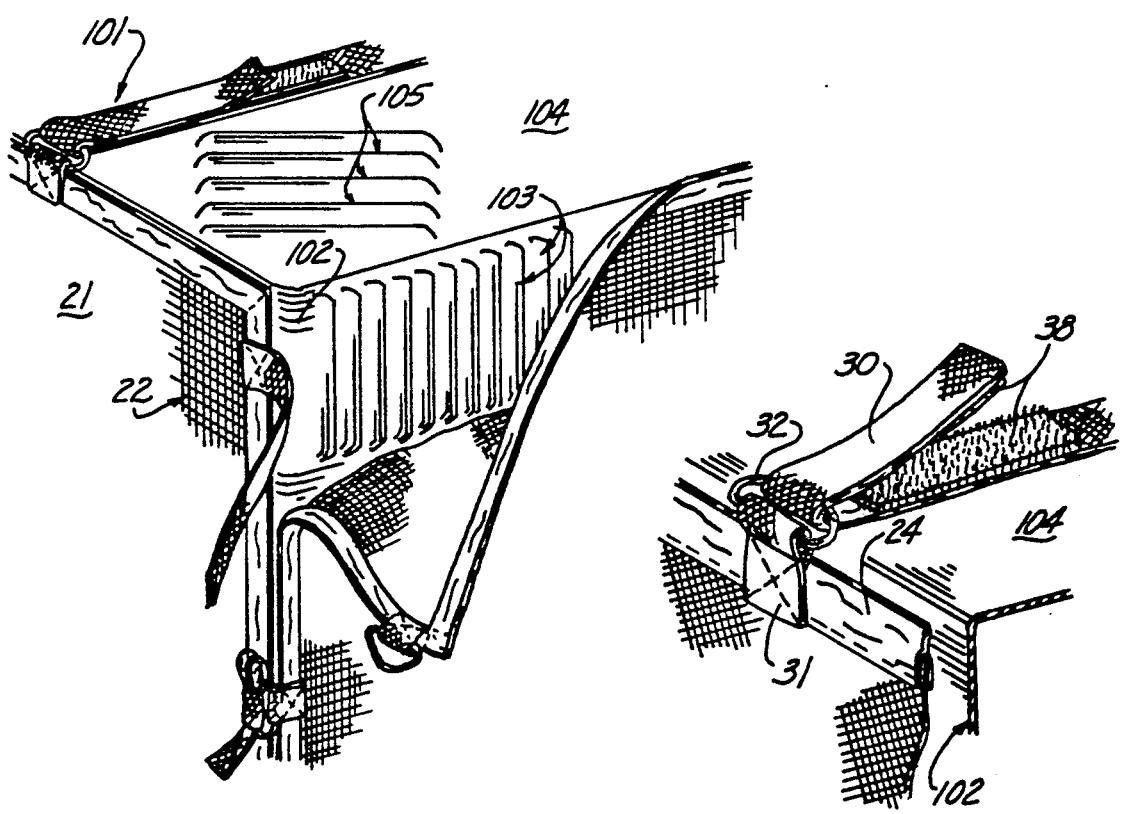

EXTERIOR CENTRAL AIR FILTERING SYSTEM

TECHNICAL FIELD

The present invention relates to the field of filter systems in general, and in particular to an exteriorly mounted filter cover for central air conditioning systems.

BACKGROUND ART

This invention was the subject matter of Document Disclosure Program Registration No. 292,319 which was filed in the United States Patent and Trademark Office on Sep. 30, 1991.

As can be seen by reference to the following U.S. Pat. Nos. 4,449,993; 4,322,232; 4,193,780; and 4,746,339; the prior art is replete with myriad and diverse filtering systems for use in a variety of environments.

While all of the aforementioned prior art constructions are more than adequate for the basic purpose and function for which they have been specifically designed, these patented constructions are generally designed for use in an internal versus an external filtering environment.

As many owners of central air conditioning systems are aware, one of the main reasons for the failure of the air conditioning compressor is the clogging of the passageway leading to the A/C coils.

As a consequence of the foregoing situation, there has existed a longstanding need among both homeowners and commercial businesses for an external air filtering system that can be removeably attached to an air conditioning unit in a surrounding relationship relative to the air intake vents to keep the A/C coils free of pet hair, debris, etc.; and, the provision of such a construction is a stated objective of the present invention.

DISCLOSURE OF THE INVENTION

Briefly stated, the external central air conditioning filter system that forms the basis of the present invention comprises a filter unit and a securing unit.

The filter unit comprises a filter member fabricated from a generally elongated rectangular sheet of filter material provided with reinforced peripheral edges; and, the securing unit comprises a plurality of elongated straps that are secured on one end at selected portions of the reinforced peripheral edges of the filter material and adapted to be releasably secured on their other ends to other selected portions of the reinforced peripheral edges of the filter material.

As will be explained in greater detail further on in the specification, the elongated generally rectangular configuration of the filter member, allows the filter member to surround the vertical sides of both cylindrical and square central air conditioning housings such that the air intake ports in the A/C housings will be covered by the filter system of this invention to pre-filter the air passing over the A/C coils.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the system installed on a conventional central air conditioning system;

FIG. 2 is an isolated perspective view of the attachment of the opposite ends of the filter unit to the A/C system;

FIG. 3 is an isolated perspective view of the attachment of the top of the filter unit to the A/C unit;

BEST MODE FOR CARRYING OUT THE INVENTION

Figure 4:
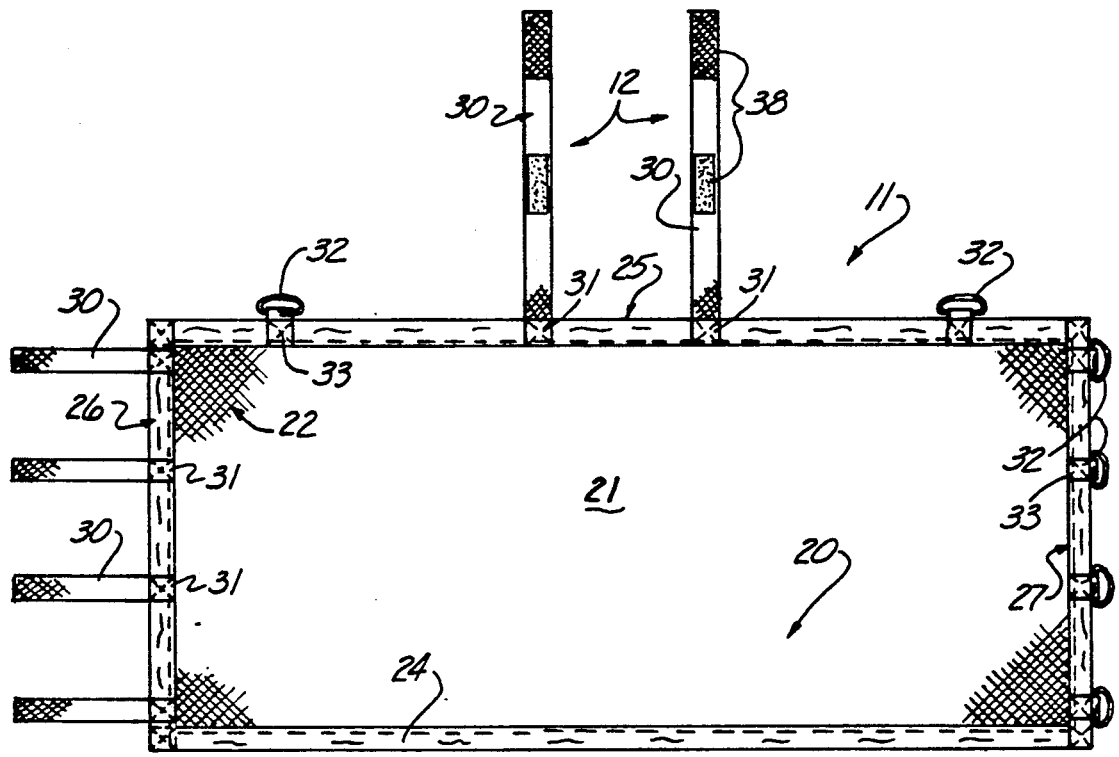
FIG. 4 is a top plan view of the filter system.

As can be seen by reference to the drawings, and in particular to FIG. 1, the filter system that forms the basis of the present invention is designated generally by the reference numeral (10); and is intended for use with a conventional central air conditioning unit (100).

As can best be seen by reference to FIGS. 1 through 3, the conventional central air conditioning unit (100) is provided with a housing (101) having sidewalls (102) equipped with air intake vents (103) and a top panel (104) equipped with air exhaust vents (105).

The external central air filtering system (10) comprises in general a filter unit (11) and a securing unit (12). These units will now be described in seriatim fashion.

As shown in FIGS. 2 through 4, the filter unit (11) comprises a generally elongated rectangular filter member (20) having a length approximately equal to the exterior circumferencial dimensions of a conventional air conditioning unit (100), and a width approximately equal to the vertical height of one of the sidewalls (102) of the conventional A/C unit.

In addition the filter member (20) comprises an elongated rectangular sheet (21) of conventional filter material (22) having reinforced peripheral edge portions (24) whose purpose and function will be described presently.

As can best be seen by reference to FIG. (4) the securing unit (12) comprises a plurality of strap members (30) secured on one end (31) at spaced locations along at least two adjacent edges of the generally rectangular filter member (20).

In addition the securing unit (12) further comprises ring members (32) attached by gussets (33) to the reinforced edges (24) along at least two adjacent sides of the filter member (20).

In the preferred embodiment depicted in FIG. 4, the top edges (25) of the filter member is provided with a pair of relatively closely spaced elongated strap members (30) which are flanked by a pair of relatively widely spaced ring members (32) and gussets (33) wherein, each of the strap members (30) are dimensioned to extend across the top panel (104) of the A/C housing in criss-cross fashion, to engage the ring member (32) spaced furthest from the respective elongated strap member (30).

Furthermore the side edges (26)(27) of the filter member (20) are provided with opposed pairs of strap members (30) and ring members (32) which are intended to be connected together in a well recognized fashion, to join the side edges (26)(27) together in a surrounding relationship relative to the exterior of the A/C housing (101).

Figure 5:
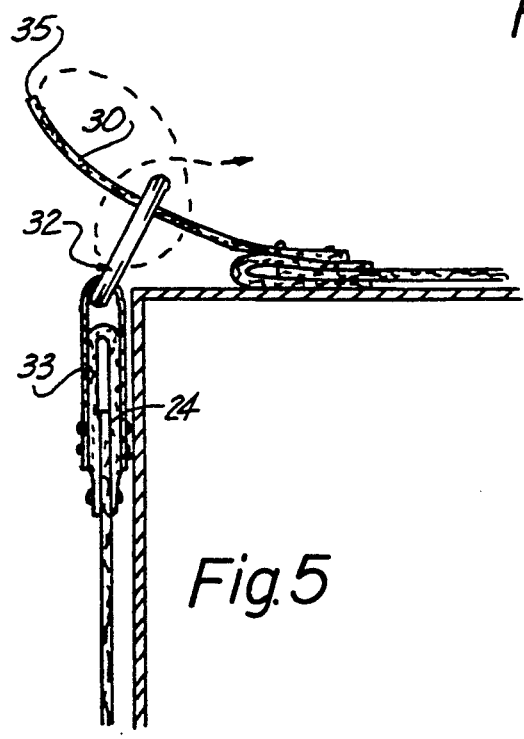
FIG. 5 is an isolated side elevation view of one method of securing the filter system to the A/C unit; and, FIG. 6 is an isolated detail view of another method of securing the filter system to the A/C unit.
Figure 6:
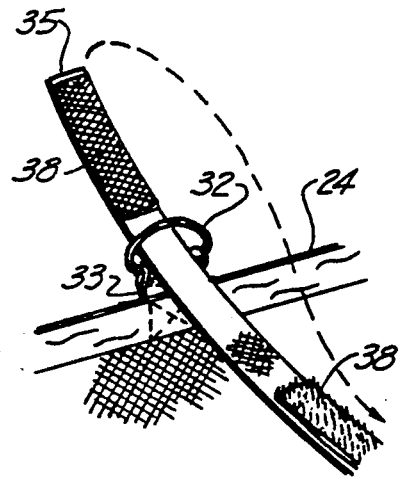

In one version of the preferred embodiment depicted in FIG. 5, the free end (35) of the strap member (30) is passed through and simply tied to the ring (32); and in another version of the preferred embodiment depicted in FIG. 6, the free end (35) of the strap member (30) is provided with cooperating hook and loop fasteners (38) which join the free end (35) of the strap member (30) into a releasable fastening loop which captively engages the ring (32) in a well recognized fashion.

It should further be noted at this juncture that the conventional filter material (22) that is employed in the filter member (20) may either be of the disposable furnace filter type for a maintenance free system (10), or of a more durable, washable nature for a system having a prolonged useful life.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

We claim:

1. A filter system for use on the exterior housing of a conventional central air conditioning system having side walls and a top panel wherein the filter system comprises:

a filter member including an elongated generally rectangular sheet of filter material having reinforced peripheral edges;

means for releasably securing opposite ends of the filter member such that the filter member is disposed in a surrounding relationship with the exterior side walls of the central air conditioning system; and, means operatively associated with the reinforced top edge of the filter member for suspending the filter member from the top panel of the air conditioning system.

2. The filter system as in claim 1; wherein, said means comprise: a plurality of strap members having one end secured to at least some of the reinforced edges of the filter member.

3. The filter system as in claim 2; wherein, said means further comprise: a plurality of ring members operatively associated with at least some of the reinforced edges of the filter member; wherein each of said ring members are dimensioned to receive said plurality of strap members.

4. The filter system as in claim 2; wherein, at least at least some of said plurality of strap members are dimensioned to extend across the top panel of said central air conditioning system.

* * * * *